Nov. 15, 1932.  C. N. POGUE  1,888,013
ROUTE INDICATOR
Filed Feb. 16, 1931   2 Sheets-Sheet 1
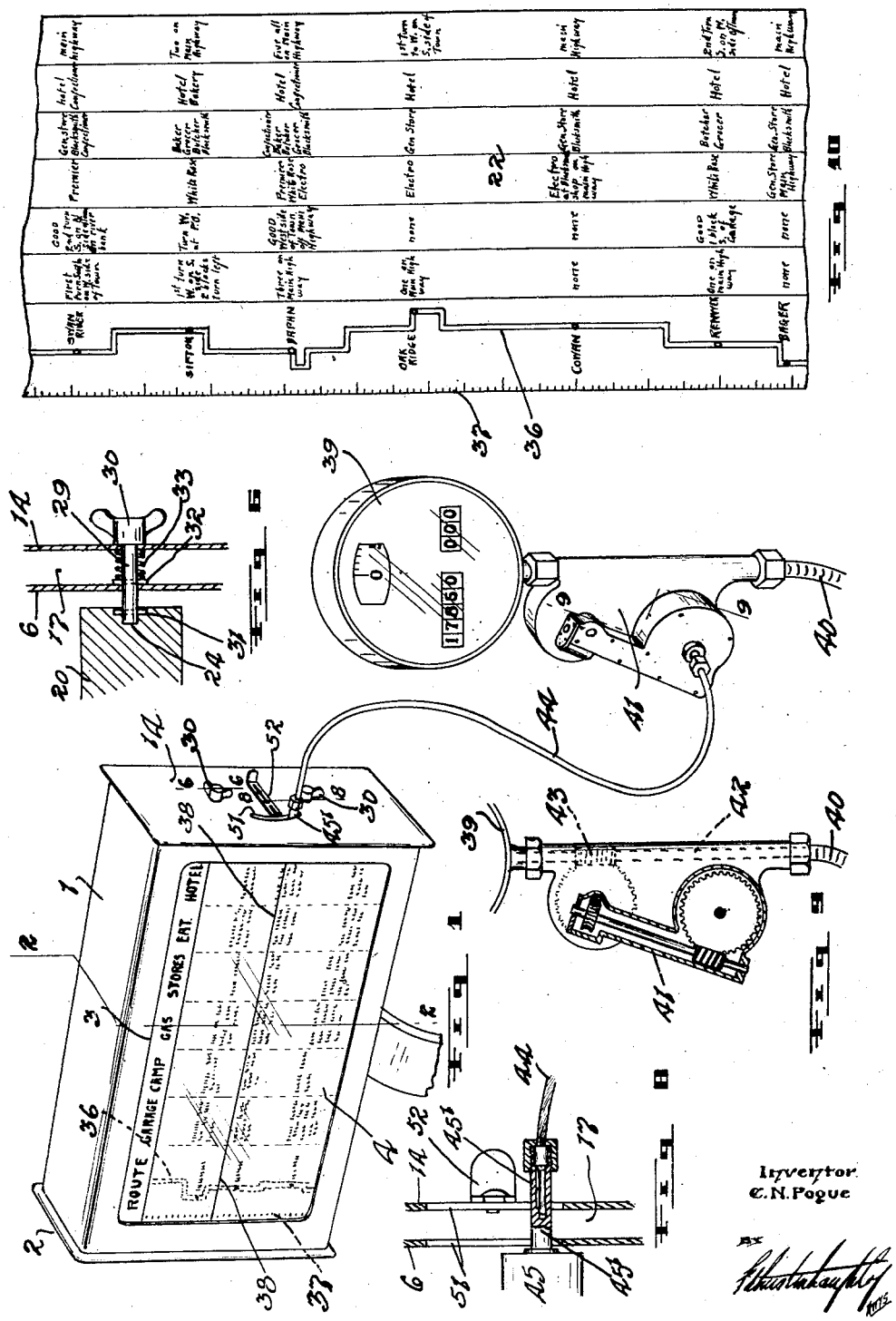

Nov. 15, 1932.  C. N. POGUE  1,888,013
ROUTE INDICATOR
Filed Feb. 16, 1931  2 Sheets-Sheet 2
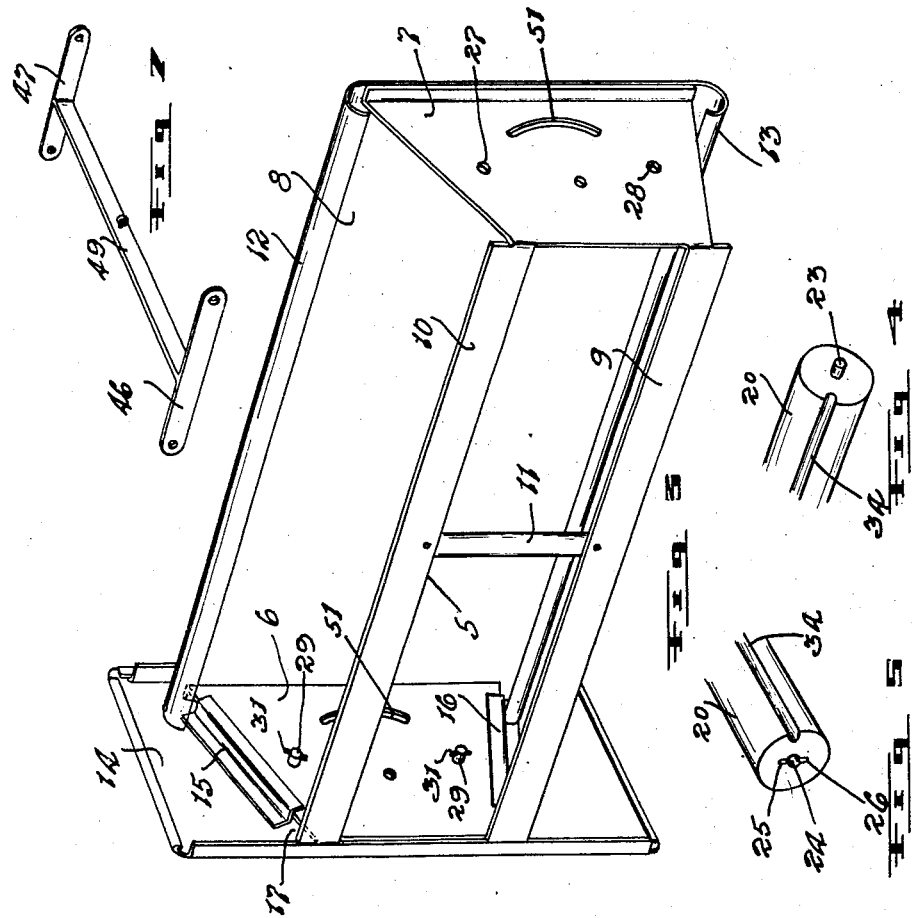
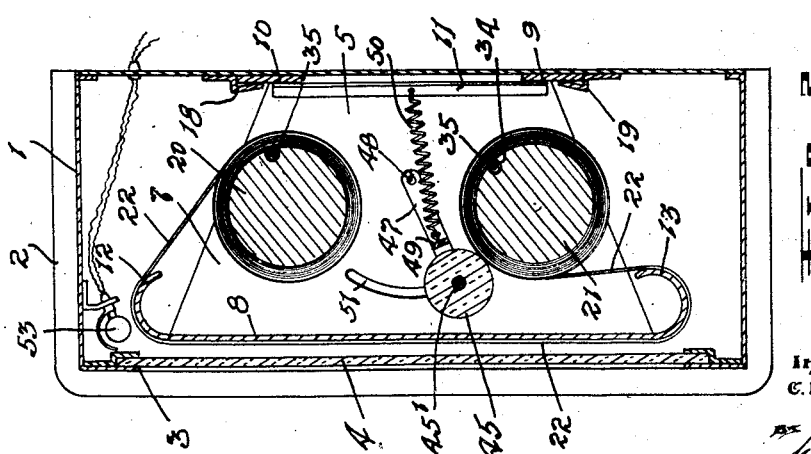
Inventor
C. N. Pogue Patented Nov. 15, 1932

1,888,013

UNITED STATES PATENT OFFICE

CHARLES N. POGUE, OF ST. BONIFACE, MANITOBA, CANADA

ROUTE INDICATOR

Application filed February 16, 1931, Serial No. 515,986, and in Canada August 5, 1930.

The invention relates to improvements in route indicators and an object of the invention is to provide an indicator for a vehicle which will definitely and visibly indicate on a route map the exact location of the vehicle at any time as it travels over the route and which is arranged so that different route maps can be inserted when required to cover different routes to be travelled and which is arranged also so that the route can be travelled in either direction with the indicator functioning.

A further object is to arrange the device so that it can be readily thrown out of commission when one does not wish it to register and such that the reversal of the direction of travel of the map can be readily brought about and such that when desired, the map can be manually shifted in either direction.

A further object is to construct the complete device in a simple, durable and inexpensive manner and so that the map carrying rollers can be readily removed when it is desired to change maps and also such that all interior parts can be readily exposed for inspection or other purposes.

A still further object is to provide an arrangement whereby the device can be readily driven by the existing drive for operating the vehicle speedometer and without interfering with the operation of the speedometer.

A still further object is to embody with the route map other information which will automatically appear as the route is travelled, the information appearing being valuable to the driver and car occupants and in regard to the various places through which the route passes.

With the above important and other minor objects in view which will become more apparent as the description proceeds, the invention consists essentially in the arrangement and construction of parts hereinafter more particularly described, reference being had to the accompanying drawings, in which:—

Fig. 1 is a perspective view of the indicator and showing also the speedometer and the driving connections for both the indicator and the speedometer.

Fig. 2 is an enlarged detailed vertical sectional view centrally through the indicator.

Fig. 3 is a perspective view of the indicator frame structure and the end plate carrying the same.

Figs. 4 and 5 are perspective views of the opposite ends of the winding rollers employed.

Fig. 6 is an enlarged detailed vertical sectional view through the end of one of the rollers and the adjacent end of the casing and showing in side elevation the means employed for supporting that end of the roller and for manually turning the same when desired.

Fig. 7 is a perspective view of the swinging arms which carry the driving roller.

Fig. 8 is an enlarged detailed sectional view showing the driving connection for the driving roller.

Fig. 9 is a vertical sectional view through a portion of the gear casing.

Fig. 10 is a plan view of a portion of the route map.

In the drawings like characters of reference indicate corresponding parts in the several figures.

At the present time, road maps or route maps are provided for automobile drivers to guide them in their travels and the driver has to refer to the map from time to time and quite often with considerable inconvenience especially when travelling to check his location, particularly when travelling in a district unfamiliar to him. His difficulty is materially increased when night travelling as he may miss seeing road signs or village or town names and not really know he is on the wrong road until he has travelled a considerable distance out of his way. According to my invention, I propose providing the driver with an indicator containing a route map for the route to be travelled and which will visibly and positively indicate at all times, the exact location of the vehicle at any point on the route so that by reference to the indicator, the driver knows his exact location.

In carrying out my invention, and as herein disclosed, I provide a casing in which a map for the route to be travelled is placed and the map is driven or moved so that by observation, it indicates by reference to a fixed mark on the casing, the exact location of the vehicle at any point on the route.

Referring now to the drawings, the casing 1 is substantially rectangular and has one end permanently closed by an end plate 2 and the other end open and the front side provided with a substantially rectangular relatively large sight opening 3 closed by a transparent plate 4. Within the casing, I locate a removable frame indicated generally by the reference numeral 5 which frame embodies opposing end plates 6 and 7, a front plate 8 connecting the end plates and a pair of spaced horizontally disposed rear guide bars 9 and 10 connecting the plates, the latter bars having a brace bar 11 extending centrally there between. The upper and lower edges of the plate 8 are rolled backwardly as indicated at 12 and 13 to provide guides and a substantially rectangular closure plate 14 is fastened permanently by clips 15 and 16 to the plate 6, there being a space 17 reserved between the latter plates.

The frame is designed to pass endwise into the casing with the plate 8 directly to the rear of the window or transparent plate 4 and the guide bars 9 and 10 slidably received within horizontal guides 18 and 19 secured to the back wall of the casing, such latter construction supporting the frame in operating position within the casing and permitting of the ready removal of the same when desired. When the frame is in its final position within the casing, the plate 14 closes the open end of the casing in the manner best shown in Figure 1.

The end plates 6 and 7 support rotatably upper and lower rollers 20 and 21 and these rollers carry a winding strip 22 which passes over the front side of the plate 8 and is visible through the window. Each roller is provided at one end with a pivot pin 23 and at the other end with a central circular hole 24 having radial slots 25 and 26 extending therefrom and the pivot pins are adapted to enter bearing holes 27 and 28 provided in the plate 7.

In locations horizontally aligned with the holes 27 and 28, the plates 6 and 14 support rotatably similar winding spindles 29 provided at their outer ends with finger pieces 30 and at their inner ends with cross pins 31. Each spindle 29 is fitted also with a further pin 32 engaging the plate 6 and a coiled spring 33 is interposed between the latter pin and the plate 14. The inner ends of the spindles are adapted to enter holes 24 of the rollers with the pins 31 in the slots 25 and 26, the arrangement being such that the rollers are rotatably supported and also can be turned by manipulating the finger pieces. The arrangement also permits the rollers to be dismounted by pulling outwardly on the finger pieces to withdraw the inner ends of the spindles from the rollers and then end shifting the rollers to withdraw the pins 23 from the holes in the plate 7.

I have not considered it necessary to give a more detailed explanation of this latter arrangement as it is a well known construction. Each roller is provided in its peripheral face with a longitudinally extending slot 34 which is adapted to receive the end of the winding strip 22 and for convenience in manipulating, the ends of the strip are herein shown as provided with reinforcing wires 35.

The strip 22 is provided with a road guide indicated generally by the reference numeral 36 which will of course vary with the different routes to be travelled. This route guide will show the different cities, towns or villages passed through, also the various turns in the road as is at the present time common practice. It will have also appearing thereon a scale 37 indicating miles travelled and I consider it desirable also to have on the winding strip and opposite the various indicated points on the guide, information relative to those points which will be of value and interest to the traveller. In the strip shown in Figure 10, it will be noted that there are a number of vertical columns containing information, the information being located horizontally opposite different places indicated on the route 36. It will also be noted (see Figure 1) that at the top of the window I have printed headings which lie directly over the upper ends of the columns so that by reference to the headings, one can quickly obtain the information appearing in the underlying columns.

On the window, I have drawn a horiontal indicating line 38 passing from side to side of the window and this line obviously crosses the mile scale, the route guide and also the adjoining columns. Consequently if the winding strip be moved at a determined speed as the vehicle travels, it will not only indicate on the map the exact location of the vehicle at any time but also the mileage and will also give in the area adjoining the line 38 desirable information about the several places indicated on the strip.

As all motor vehicles are at the present time equipped with the well known speedometer driven in the well known manner by a flexible driving cable from one of the front wheels of the vehicle, I have considered it desirable to utilize such speedometer driving cable to drive my route indicator.

The conventional speedometer is indicated generally by the reference numeral 39 in Figure 1 and the customary flexible cable for driving the same is indicated by the reference numeral 40 which cable ordinarily is connected directly to the speedometer. Where my indicator is to be installed, however, I introduce a reducing gear casing 41 between the driving cable 40 and the speedometer which in no way interferes with the driving of the speedometer in the usual manner but gives me a drive for the driving roller which I employ in my casing. The driving cable 40 drives a spindle 42 which drives the speedometer in the usual manner and the spindle is provided with a worm 43 which drives a train of worm wheels and worms contained in the casing 41 and operates to drive the flexible cable 44 at a reduced speed which cable drives the driving roller 45 before mentioned in the indicator casing.

The driving roller 45 is rotatably carried by a pair of swinging arms 46 and 47 pivotally supported by aligned pivot pins 48 from the plates 6 and 7 and the arms are connected by a brace bar 49 so that they will swing together. A coiled spring 50 connects the brace bar with the bar 11 and according to this arrangement, it will be apparent by reference to Figure 2 that the spring will operate to hold the roller 45 in contact with the roller 21 when the spring is below the dead central point 48 and that on the other hand, when the roller 45 is swung upwardly into contact with the roller 20, the spring will operate to hold such rollers in engagement as it, the spring, is then above the dead central point 48.

It will at this point be noticed (see Figure 2) that the ends of the strip are tightly wound on the rollers 20 and 21, the arrangement being such that when the roller 45 is in contact with the strip on the roller 21 and driven in a counter clockwise direction, it will roll the strip onto the roller 21 and unwind the same from the roller 20 and that upon the roller 45 being thrown into contact with the strip wound on the roller 20 and while driven in the same counter clockwise direction, will wind the strip 22 onto the roller 20 and unwind it from the roller 21. This arrangement obviously permits me to readily reverse the direction of travel of the route guide, such being desirable when one has completed their journey and desires to return home by the same route.

In order that the roller 45 can be readily moved from one driving position to the other, I have provided arcuate slots 51 in the plates 6, 7 and 14 and have passed the ends of such roller shaft 45' through these slots to the exterior of the casing, the one end being connected to the driving cable 44. By such provision, one can at any time place his fingers against the sides of the protruding ends of the roller shaft and force it up or down as desired.

One may at times desire to stop the travel of the route guide or correct its setting and for this reason I have provided the plates 2 and 14 with sliding finger actuated catches 52 adapted when actuated to catch and hold the shaft 45' when the driving roller 45 is in a neutral position, that is, positioned intermediately between the other rollers. With the driving roller held clear of the other rollers, one can then readily move the strip 22 in either direction by manipulating one or other of the finger pieces 30.

When it is desired to change the route guide, one withdraws the frame from the casing by sliding it outwardly, then dismounts the rollers by pulling back the spindles and then replaces the guide with a new guide as will be readily understood and returns the parts to their original places.

While I have shown the driving connections for the driving roller as driven by the flexible cable operating the speedometer, it will be readily understood that this has been done only as a matter of convenience as a separate and distinct drive could be utilized if desired. Further in regard to the drive for the route guide, I wish it to be distinctly understood that any type of drive can be employed provided, of course, that the rate at which the guide is moved is such that the guide will indicate with reference to a fixed point, the precise location of the vehicle at any time.

In order that the device may be advantageously used for night driving, I have provided an electric lamp 53 in the upper part of the casing which will be connected with a suitable source of current and which is positioned so that the light rays will shine down over the front face of that part of the strip passing over the plate 8.

What I claim as my invention is:—

1. A route indicator for a vehicle comprising a stationary receiving casing having a sight opening therein, an endwise withdrawable frame slidably carried by the casing, winding rollers rotatably carried by the frame and removable therewith, a winding strip connecting the rollers and having a portion thereof visible through the sight opening, said strip being provided with road signs of the route to be traversed by the vehicle and means actuated by the vehicle as it progresses over the route for driving the rollers, said means being attached to the removable frame.

2. A route indicator for a vehicle comprising a stationary receiving casing having a sight opening therein, an endwise withdrawable frame slidably carried by the casing, winding rollers rotatably carried by the frame and removable therewith, a winding strip connecting the rollers and having a portion thereof visible through the sight opening, said strip being provided with road signs of the route to be traversed by the vehicle and flexible roller driving means attached to the frame and actuated by the vehicle as it progresses over the route, said flexible driving means permitting of the withdrawal of the frame and parts carried thereby without requiring disconnection of said driving means.

3. A vehicle route guide comprising a stationary casing provided with a sight opening, an endwise withdrawable frame slidably carried by the casing, a pair of winding rollers rotatably and demountably carried by the frame and removable with the frame as a unit from the casing, a winding strip connecting the rollers and having a portion thereof visible through the sight opening, said strip being provided with road signs of the route to be traversed by the vehicle and a flexible driving connection for the rollers, said connection being actuated by the vehicle as it progresses over the route and being connected to the frame and permitting of the removal of the frame from the casing without requiring the disconnection of the said driving means.

4. A vehicle route guide comprising a stationary casing provided with a sight opening, a withdrawable frame mounted in the casing, a pair of winding rollers rotatably and demountably carried by the frame and removable with the frame as a unit from the casing, a winding strip connecting the rollers and having a portion thereof visible through the sight opening, said strip being provided with road signs of the route to be traversed by the vehicle, a driving roller carried by the frame and interposed between said former rollers and mounted for selective engagement with either of said rollers to rotate the same and a flexible drive for the driving roller, said drive being actuated by the vehicle as it progresses over the route and being connected to the frame thereby permitting of the removal of the frame and parts carried thereby without requiring the disconnection of the drive.

Signed at Winnipeg, this 5th day of August, 1930.

CHARLES N. POGUE.